UNITED STATES PATENT OFFICE.

VICTOR G. BLOEDE, OF CATONSVILLE, MARYLAND.

PROCESS OF PRODUCING METAL ART OBJECTS SET WITH JEWELS.

SPECIFICATION forming part of Letters Patent No. 536,259, dated March 26, 1895.

Application filed December 22, 1893. Serial No. 494,432. (No specimens.)

*To all whom it may concern:*

Be it known that I, VICTOR G. BLOEDE, a citizen of the United States, residing at Catonsville, in the county of Baltimore and State of Maryland, have invented certain new and useful Improvements in Processes of Producing Metal Art Objects Set with Jewels; and I do hereby declare that the following is a full, clear, and exact description of the invention, which will enable others skilled in the art to which it appertains to make and use the same.

Heretofore it has been customary to set jewels, glass, and precious stones by providing a proper frame or recess in the metallic object used for the purpose of setting same and then by bending or hammering, or turning the edge of the frame or collar over the stone by other mechanical process, firmly securing same. This process of stone or glass setting is both expensive and tedious, and requires considerable skill and experience on the part of the operator and even then frequently causing the destruction or damage of the stone, or object set. My improved process of setting is free from all of these objections, and consists in effecting the fixation or setting of the jewels, stones, or other material, by films or bezels of metal produced by electric deposition into or upon temporary plastic molds, in which the stones or jewels have been previously inserted.

To carry out my invention I proceed as follows: A mold or reverse impression of the object to be decorated or incrusted with jewels, is first made in wax, gutta percha or other plastic material, and those parts of the stones or jewels intended to be exposed in the finished object are then embedded in this mold. Then the entire inner surface of the mold of the object to be reproduced including the backs of the stones or jewels, is made conductible by means of graphite or other conducting substances and then the mold thus prepared is covered with a suitable metal by electric deposition, so as to firmly hold the stones, and its own shape. The temporary mold of plastic material is then removed, thus producing a jeweled or decorated ornament or article of use, of pleasing and substantial character.

I am aware that diamonds have been set in previously formed metal shapes or cavities by electrolysis, for the purpose of producing drills or tools, but this differs entirely from my process, inasmuch as I use temporary plastic molds instead of metal shapes or cavities, and produce my stone setting and metallic art object simultaneously.

What I desire to claim and secure by Letters Patent is—

The method of producing an object of metal containing jewels or other settings, consisting in providing a temporary mold or back of plastic material, embedding therein those portions of the jewels which are to be exposed in the finished article, covering the remaining portions of the jewels and the adjacent surface of the backing with a conductor, depositing a film or bezel of metal upon the same by electrolysis, and finally removing the deposit of metal and jewels from the back, as set forth.

VICTOR G. BLOEDE.

Witnesses:
J. E. NOWLIN,
A. G. HUBBELL.